United States Patent [19]
Thoen et al.

[11] Patent Number: 5,910,358
[45] Date of Patent: Jun. 8, 1999

[54] PVC-FREE FOAMED FLOORING AND WALL COVERINGS

[75] Inventors: Johan A. Thoen, Terneuzen, Netherlands; Kyung W. Suh, Granville, Ohio; James G. Kennedy, Sint Jansteen, Netherlands; Creston D. Shmidt, Nashport, Ohio

[73] Assignee: The Dow Chemical Company, Midland, Mich.

[21] Appl. No.: 08/746,035

[22] Filed: Nov. 6, 1996

[51] Int. Cl.⁶ .................................................. B32B 3/26
[52] U.S. Cl. .................................. 428/316.6; 428/318.4; 428/318.6; 428/332
[58] Field of Search .............................. 428/304.4, 308.4, 428/318.4, 318.6, 316.6, 336, 332, 908.8

[56] References Cited

U.S. PATENT DOCUMENTS

| | | | |
|---|---|---|---|
| 3,048,537 | 8/1962 | Pall et al. | 428/318.6 |
| 3,213,071 | 10/1965 | Campbell | 428/318.6 |
| 3,391,823 | 7/1968 | Tijms | 428/318.6 |
| 3,816,233 | 6/1974 | Powers | 264/54 |
| 4,172,917 | 10/1979 | Angelle et al. | 428/95 |
| 4,207,278 | 6/1980 | Cowen et al. | 264/46.4 |
| 4,230,759 | 10/1980 | Kauffman et al. | 428/159 |
| 4,329,386 | 5/1982 | Samowich | 428/318.6 |
| 4,599,264 | 7/1986 | Kauffman et al. | 428/264 |
| 4,810,570 | 3/1989 | Rutten et al. | 428/318.6 |
| 4,828,881 | 5/1989 | Brown et al. | 427/208 |
| 4,857,566 | 8/1989 | Helbling | 523/409 |
| 4,983,443 | 1/1991 | Balmer et al. | 428/318.4 |
| 5,082,705 | 1/1992 | Rose | 428/40 |
| 5,223,322 | 6/1993 | Coiyer et al. | 428/141 |
| 5,276,082 | 1/1994 | Forry et al. | 524/504 |
| 5,300,361 | 4/1994 | Vowinkel et al. | 428/318.6 |
| 5,316,840 | 5/1994 | Kubo et al. | 428/318.4 |
| 5,320,905 | 6/1994 | Vaughn et al. | 428/401 |
| 5,347,296 | 9/1994 | Lewicki, Jr. et al. | 346/153.1 |
| 5,407,617 | 4/1995 | Oppermann et al. | 264/46.4 |
| 5,539,021 | 7/1996 | Pate et al. | 523/335 |

FOREIGN PATENT DOCUMENTS

| | | | |
|---|---|---|---|
| 0 203 399 | 12/1986 | European Pat. Off. | 428/318.4 |
| 0 621 128 A2 | of 1994 | European Pat. Off. | |
| 0 780 207 A2 | of 1997 | European Pat. Off. | |
| 2 508 379 | 12/1982 | France | 428/318.4 |
| 42 22 724 A1 | of 1994 | Germany | |
| 44 27 085 A1 | of 1996 | Germany | |
| 56-95644 | 8/1981 | Japan | 428/318.6 |
| 62-149431 | 7/1987 | Japan | 428/318.4 |
| 503 631 C2 | 7/1992 | Sweden | |
| 96/04419 | 2/1996 | WIPO | |

OTHER PUBLICATIONS

J. Thoen, "Novel Polyolefins Made With Insite* Technology in Flooring Applications", *The Polymer Processing Society European Meeting 1995*.
Derwent Abstract No. 80–25655C (Undated).
Derwent Abstract No. 93–135903 (Undated).
Derwent Abstract No. 92–115855 (Undated).
Derwent Abstract No. 90–013254 (Undated).
Derwent Abstract No. 84–128731 (Undated).
Derwent Abstract No. 76–92809X.
Derwent Abstract No. 94–256286.
Derwent Abstract No. 94–017180.
Derwent Abstract No. 93–001031.
Derwent Abstract No. 92–425232.
Derwent Abstract No. 84–182835.
Derwent Abstract No. 82–41897E.
Derwent Abstract No. 95–123290.
Derwent Abstract No. 84–182835.
International Search Report dated Feb. 19, 1998 issued by the EPO acting as the International Searching Authority in PCT/US97/20255.

*Primary Examiner*—Allan R. Kuhns

[57] ABSTRACT

The present invention pertains to a multilayer foamed flooring and wall product. The inventive product is a resilient cushion foam flooring and wall product that is free of polyvinyl chloride (PVC), plasticizers and heavy metal stabilizer. The product is made of a multilayer top layer which is integrated with a latex or polyolefin polymer foam back layer. The product has particular utility in the heterogeneous flooring market and can be prepared using ordinary PVC melt processing equipment.

22 Claims, 1 Drawing Sheet

PVC-FREE FOAMED FLOORING AND WALL COVERINGS

FIELD OF THE INVENTION

The present invention pertains to a multilayer foamed flooring and wall covering product. The invention particularly pertains to a resilient cushion foam flooring and wall covering product free of polyvinyl chloride (PVC) and plasticizers and comprising a thermoplastic top covering layer integrated with a latex or thermoplastic foam backing layer.

BACKGROUND OF THE INVENTION

The heterogeneous flooring and wall coverings market segment includes textile and plastic coverings. The heterogeneous coverings segment is distinguished from the homogeneous coverings segment (which includes materials such as linoleum) in that the heterogeneous segment refers to multilayer covering constructions involving different materials. In the heterogeneous resilient cushion flooring and wall covering market segment, there is a need for improved ecological solutions as alternatives to plasticized polyvinyl chloride (PVC) coverings and, to some extent, for alternatives to conventional textile coverings. The ecological concerns respecting the heterogeneous PVC covering segment pertain to recyclability or energy recovery, volatile organic content levels, and the use of heavy metal stabilizers and inorganic fillers. The ecological concerns pertaining to textile coverings include inhibition of or barrier against microorganism growth.

Heterogeneous foamed PVC flooring and wall coverings have been extremely popular due their simple installation and low cost. However, a great deal of their popularity is also owed to their attractive performance properties which include sound insulation, walking and standing comfort and print-design versatility. Minimum performance requirements in the segment include an EN433 indentation recovery (normalized) of greater than or equal to 90 and a DIN53455 elongation of greater than or equal to 150 percent.

Typical foamed PVC covering construction includes a PVC-plastisol based covering. The plastisol typically consists of PVC particles, plasticizer, heavy metal additives and inorganic filler. The covering layer is formed in a spreading process by laying-down the plastisol on a fabric or release paper substrate and subsequently curing the plastisol. The use of a fabric substrate such as fleece (as opposed to a release paper substrate) provides an intermediate material layer which confers enhanced dimensional stability to the cured covering.

The PVC covering layer is typically manufactured using a calendaring or roll mill process. In such processes, rigid PVC is formulated with plasticizers and heavy metal stabilizers. The use of heavy metal stabilizers (e.g., dilauryl tin distearate or carboxylates of barium and cadmium, barium and zinc or calcium and zinc) is especially important in these melt processes to avoid undo degradation of the polyvinyl chloride polymer.

However, whether manufactured using a spreading process or a calendaring process, in order to avoid an excessive number of seams or joints when installed, foamed PVC coverings are typically manufactured as endless webs having widths up to 4 or 5 meters. This width requirement is generally considered to significantly limit the possible products and/or processes available for providing suitable alternatives for foamed PVC coverings. See, for example, the disclosure by Oppermann et al. in U.S. Pat. No. 5,407,617 at Col. 1, lines 32–36, the disclosure of which is incorporated herein by reference. In particular, known processes for manufacturing crosslinked thermoplastic foams are said to be limited to widths of about 2 meters due to die width limitations. See, U.S. Pat. No. 5,407,617 at Col. 2, lines 8–28.

To overcome the perceived limitations of using established thermoplastic foaming processes, and thereby provide a PVC-free covering, Oppermann et al. describes a covering constructed from an acrylic wear layer and a thermoplastic foam backing. The thermoplastic foam backing disclosed by Oppermann et al. is made using a powder sintering process wherein the thermoplastic is formulated with a conventional blowing agent, cryogenically ground to a fine mesh powder, then sintered or scattered to 4–5 meters and finally foamed at about 120 to about 200° C. However, powder sintering is relatively slow and in general is not considered to be conducive to high production rates. Also, acrylic wear layers such as described by Oppermann et al. are considered to exhibit mediocre scratch and abrasion resistance and the acrylate emulsions from which the acrylic layer is derived is also considered to be fairly expensive.

Urethane foamed backings with good wear resistance properties are also known wherein foaming is accomplished mechanically by air injection. However, urethane systems are fairly expensive and are not susceptible to foam inhibition. Moreover, there is no realistic opportunity to provide a substantially complete urethane covering to facilitate easy recyclability.

Hence, there is a need for a PVC-free resilient foam cushion flooring and wall covering product that meets the performance attributes of known heterogeneous coverings based on PVC. Such a product should be manufacturable at widths of at least 4 meters using low cost processing methods common to the heterogeneous covering segment.

SUMMARY OF THE INVENTION

As an alternative to known heterogeneous PVC coverings and other thermoplastic coverings, we have a discovered a substantially olefinic, substantially melt processed resilient cushion foam flooring and wall covering product and a method for making the product. The product is free of polyvinyl chloride and plasticizers and is substantially recyclable, or at least, can be incinerated for purposes of energy recovery without substantial generation of chlorine and chlorine combustion products.

The broad aspect of the present invention is a multilayer resilient cushion foam floor or wall covering comprising a top layer, wherein the top layer includes:

(a) a transparent upper wear layer comprised of at least one melt processed polyolefin polymer or at least one solvent dispersed polyolefin polymer or both, (b) an solvent dispersed or melt processed print layer comprised of at least one polyolefin polymer and interposed below the transparent upper wear layer, and (c) an optional melt processed polyolefin polymer or textile intermediate reinforcement layer interposed below the print layer, wherein the transparent upper wear layer and the print layer have a combined thickness of from about 50 to about 800 microns and the optional intermediate layer has a thickness of from about 5 to about 500 microns, and wherein the top layer is integrated with a foamed backing layer comprised of a latex composition, a melt processed polyolefin composition of at least one polyolefin polymer, or a solvent dispersed polyolefiln composition of at least one polyolefin polymer.

Another aspect of the invention is a method of making a multilayer flooring or wall covering comprising (a) providing a top layer by
   i. solvent dispersing or melt processing at least one polyolefin polymer to form a transparent upper wear layer;
   ii. solvent dispersing or melt processing at least one polyolefin polymer to form a print layer with a back surface and interposing the formed print layer below the transparent upper wear layer with the print layer back surface exposed;
   iii. optionally, melt processing at least one polyolefin polymer or providing a textile material to form an intermediate reinforcement layer with a back surface, and interposing the optional intermediate reinforcement layer below the print layer with the optional intermediate reinforcement layer back surface exposed;
(b) foaming a latex composition, a melt processed polyolefin composition containing at least one polyolefin polymer, or a solvent dispersed polyolefin composition containing at least one polyolefin polymer, and
(c) integrating the top layer at the print layer back surface or at the optional intermediate reinforcement layer back surface to the composition of step (b) during the foaming or after the foamed composition is cured.

One commercial benefit of the present invention is the inventive heterogeneous resilient floor and wall covering product does not have the substantial environmental impact ordinarily associated with PVC flooring and wall covering products. That is, the inventive product does not comprise heavy metal stabilizers, nitrosamines derived from curing agents or accelerators, plasticizers with a high volatile organic content, nor chlorine containing polymers and is low in ash after incineration. Thus, the inventive product can be conveniently recycled using conventional energy recovery methods based on incineration.

Another benefit of the inventive product is the polyolefin polymer that is used for the various layers of the product can be melt processed on ordinary PVC equipment such as a two-roll mill and three-roll calendar equipment. Such is surprising particularly in regards to the preferred polyolefin polymers, i.e., substantially linear ethylene polymers, because ordinary polyolefin polymers such as ethylene vinyl acetate (EVA) copolymers are generally too thermally sensitive to be melt processed on PVC equipment and as such are employed in flooring systems by alternate techniques such as powder scattering and sintering.

Melt processing equipment such as calender rolls present a particularly aggressive thermal environment in that the polymer melt is substantially exposed to atmospheric oxygen. Given such aggressive environments, the thermal insensitivity of substantially linear ethylene polymers is surprising in that Lai et al. in U.S. Pat. Nos. 5,272,236 and 5,278,272 (the disclosures of which are incorporated herein by reference) describe substantially linear ethylene polymers as having long chain branching and as prepared with only nominal levels of conventional stabilizers. However, long chain branching is generally known to render polyolefin polymers more susceptible to thermal degradation during melt processing. Further, the thermal insensitivity of substantially linear ethylene polymer is also surprising in view of the disclosure in copending application 08/055,063, filed Apr. 28, 1993, that such polymers are more responsive to irradiation.

DESCRIPTION OF THE INVENTION

Figure 1:
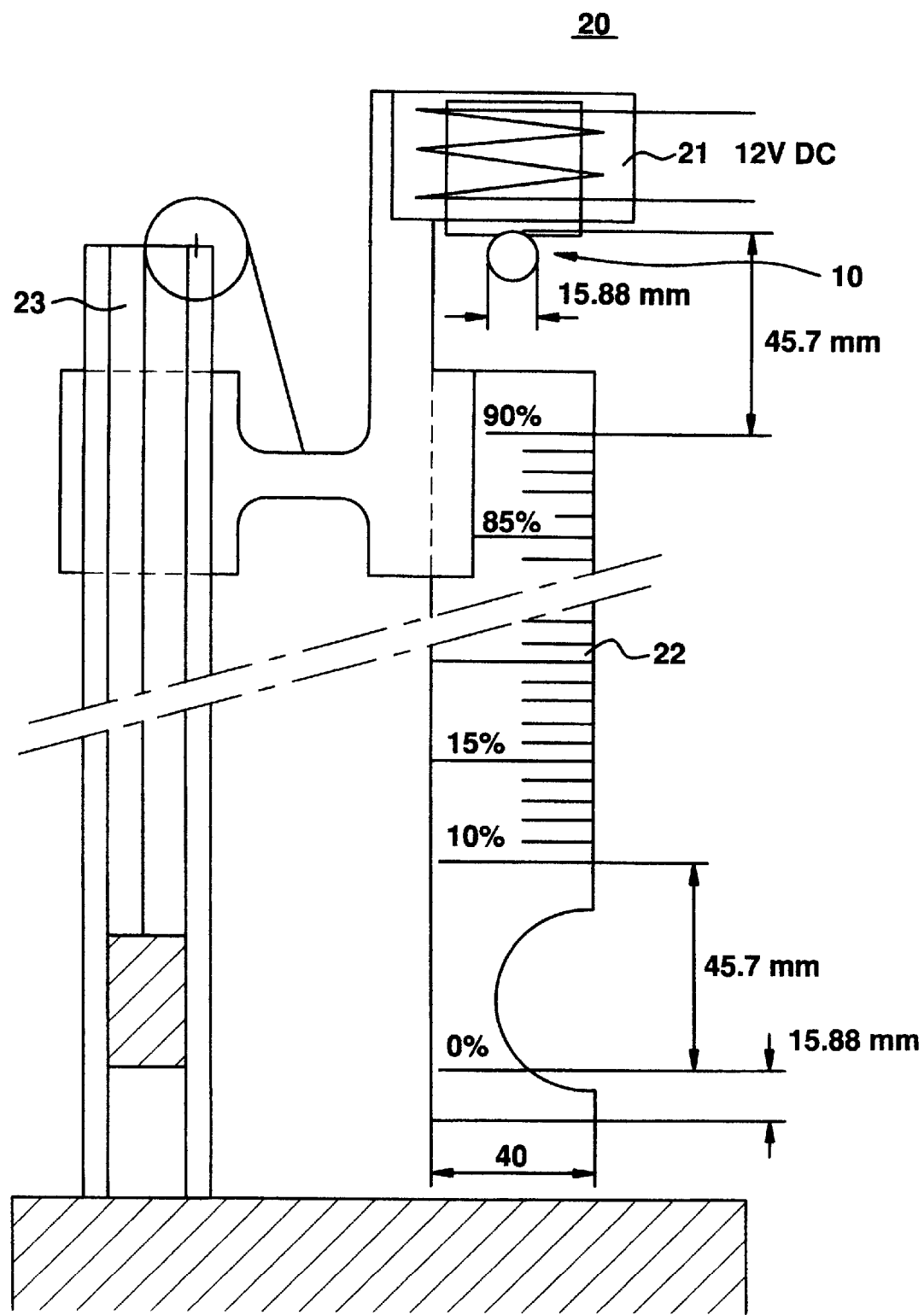
FIG. 1 is a diagram of a steel ball bearing 10 and an apparatus 20 equipped with an electromagnet 21, graduated vertical tube 22 and counter balance assembly 23 used that is used for resiliency testing.

The floor and wall covering product of the present invention has a resilient cushion foam backing layer which is integrated with a top structure. The top structure is a substrate for the resilient cushion foam backing layer and comprises a transparent polymeric upper wear layer, a polymeric print layer and an optionally polymeric or textile intermediate reinforcement layer. Whereas a non-filled PVC flooring or wall covering product typically has a bulk density of 1.3 kg/liter, the inventive product is lightweight (i.e., is preferably characterized as having a bulk density of from about 0.8 to about 0.9 kg/liter) and yet generally exhibits the performance durability of PVC covering.

The transparent upper wear layer provides good scratch and abrasion resistance and is sufficiently transparent to allow the print design to be visible from and through the topside of the product. The transparent upper wear layer is made from at least solvent dispersed polyolefin polymer and/or at least one melt processed polyolefin polymer. The preferred transparent upper wear comprises both a melt processed polyethylene or polypropylene layer and a aqueous dispersed ethylene polymer layer wherein the aqueous dispersed ethylene polymer layer is the uppermost layer of the transparent upper wear layer. The preferred aqueous dispersed ethylene polymer is at least one substantially linear ethylene polymer as described by Lai et al. in U.S. Pat. Nos. 5,272,236 and 5,278,272 or at least one ethylene interpolyrmer comprised of ethylene and at least one carbonyl-containing comonomer such as, for example, an ethylene acrylic acid (EAA) copolymer, an ethylene ethyl acrylate (EEA) copolymer, an ethylene methyl methacrylate (EMMA) copolymer, an ethylene butyl acrylate (EBA) copolymer or an ethylene methacrylic acid (EMAA) copolymer, or mixture of at least one substantially linear ethylene polymer and at least one ethylene interpolymer comprised of ethylene and at least one carbonyl-containing comonomer. One preferred aqueous dispersion polyolefin polymer composition is a 50/50 mixture of a substantially linear ethylene polymer and an ethylene acrylic acid copolymer. Generally, the ethylene interpolymer neutralized with ammonium, however, more preferably, the ethylene interpolymer is neutralized with a stable cations which provide an ionomer when the solvent (particularly, water) is removed. Such preferred cations include potassium, zinc and copper as provided, for example, by potassium hydroxide and zinc hydroxide. However, mixed base cation systems are also suitable for use in the present invention.

With regard to solvent dispersed polyolefin polymers for use in the present invention, a surfactant generally refers to an material that is employed to stabilize a dispersion. One of the advantages of dispersions based on interpolymers of ethylene and a carbonyl-containing comonomer is surfactants or any type are generally not required to provide stable dispersions of such interpolymer. However, for non-polar polymers, surfactants are generally required. As such, for example, ammoniated ethylene acrylic acid copolymer dispersion can be used as a surfactant for an aqueous dispersion of a substantially linear ethylene polymer. Thus, mixed dispersions of an ethylene acrylic acid copolymer and a substantially linear ethylene polymer are preferably prepared by separately preparing dispersions of the two polymers and thereafter admixing the two dispersions to provide a stabilized dispersed polyolefin polymer mixture.

Suitable methods for preparing solvent dispersed polyolefin polymer compositions and preferably aqueous dispersion of polyolefin polymers such as substantially linear ethylene polymers are described by Pate et al. in U.S. Pat. No. 5,539,021, and in copending application, application Ser. No. 08/463,160, filed Jun. 5, 1996, in the names of B. W. Walther and J. R. Bethea, in copending application, application Ser. No. 08/630,187, filed Apr. 10, 1996, in the names of J. E. Pate III, J. Peters, N. E. Lutenske and R. R. Pelletier, and in copending application, application Ser. No. 08/702,824, filed Aug. 23, 1996, in the names of B. W. Walther and J. R. Bethea, the disclosures of all four of which are incorporated herein by reference.

Suitable methods for preparing aqueous dispersions of ethylene interpolymers containing ethylene and at least one carbonyl-containing comonomer, including mixed base cation systems, are known. Such methods are described, for example, by Vaughrn et al. in U.S. Pat. Nos. 3,872,039; 3,899,389; and 4,181,566, and by Rowland et al. in U.S. Pat. Nos. 5,206,279 and 5,387,635, the disclosures of all five of which are incorporated herein by reference.

The polymeric print layer provides the print design for the product which may consist of three dimensional effects and images derived through the use of chemical embossing technology or the polymeric print layer may simply provide a smooth surface design. Similar to the transparent upper wear layer, the print layer comprises a solvent dispersed polyolefin polymer and/or a melt processed polyolefin polymer. Preferably, however, the print layer comprises a melt process substantially linear ethylene polymer. Also, the polymeric print layer may be foamed and contain flame retardant additives or suitable modifiers to insure compliance with flame retardant requirements and other regulatory requirements.

The intermediate reinforcement layer provides dimensional stability to the product which can be in excess of 4 meters in width. The optionally intermediate reinforcement layer is a melt processed polyolefin polymer or a nonwoven or woven textile material. Preferably, the optionally intermediate reinforcement layer is a nonwoven glass fleece material or a nonwoven polymeric material.

The resilient foam backing layer consists of a solvent dispersed polyolefin polymer, a melt processed polyolefin polymer or a latex composition. For the solvent dispersed polyolefin polymer foam backing layer and the latex foam backing layer, foaming can be accomplished mechanically such as by air injection or whipping or foaming can be accomplished by the use of microspheres filled with a volatile compound or a chemical blowing agent. For the melt processed polyolefin polymer foam backing layer, foaming is accomplished by the use of a chemical blowing agent.

The foam backing layer imparts resilient cushioning properties to the product and can also impart noise and thermal insulation characteristics to the product as well as provide a barrier against microorganisms.

In one embodiment of the invention, the foam backing layer is prepared by foam coating a curable aqueous latex composition onto the backside of a top structure. The foam coating is achieved mechanically by injecting air into wet latex composition. Sifter the foaming step, the water of the composition is conveniently removed at temperatures of about 140° C. and the latex composition is cured to yield a stable foam structure.

Suitable curable latex compositions are aqueous dispersions or emulsions comprising a latex and a water-soluble catalytic curing agent. The latex comprises a thermoplastic homopolymer or interpolymer (or mixtures of such polymers) wherein the polymer or polymers consist of at least one vinyl aromatic monomer and at least one diene, alpha-olefin, ethylene or substituted ethylene.

The vinyl aromatic monomer may be selected from styrene, alpha-methylstyrene, α,ρ-methylstyrene, α,ρ-ethylstyrene, alpha -α,ρ-dimethylstyrene, α,ρ,α,ρ-dimethylstyrene, α,ρ-t-butylstyrene, vinylnaphthalene, methoxystyrene, cyanostyrene, acetylstyrene, monochlorostyrene, dichlorostyrene, and other halostyrenes, and mixtures thereof.

The vinyl aromatic monomer may be present in any effective amount and generally in amounts of from about 0 to about 75 percent by weight, based on the total weight of the thermoplastic resin. In particular, suitable latex compositions comprise from about 20 to about 80 percent by dry weight, more preferably from about 30 to about 75 percent by dry weight, most preferably from about 35 to about 70 percent by dry weight of at least one vinyl aromatic monomer, based on the total weight of the thermoplastic resin.

The diene monomer, when present, may be selected from butadiene, isoprene, divinylbenzene, derivatives thereof and mixtures thereof. The 1,3-butadiene monomer is preferred.

Suitable latex compositions comprise generally from about 0 to about 80 percent by dry weight, preferably from about 10 to about 55 percent by dry weight, more preferably from about 20 to about 50 percent by dry weight, most preferably from about 25 to about 45 percent by dry weight of at least one diene monomer and is characterized by a percent solids of from about 10 to about 80, more preferably from about 20 to about 70 and most preferably from about 30 to about 60, based on the total weight of the thermoplastic resin.

The water-soluble catalytic curing agent may be present in an amount of from approximately 0.1 to approximately 15 percent by weight, based on the weight of the thermoplastic resin. Suitable catalytic curing agents include, but are not limited to, tridimethyl aminomethyl phenol, dimethyl aminomethyl phenol, dicyandiamide, polyamines such as, for example, ethylenediamine, diethylenetriamine, triethylene tetramine, tetraethylene pentamine and isophorone diamine.

The latex component of the curable latex composition may further include an emulsifier or surfactant. Suitable surfactants include conventional nonionic and/or anionic surface active agents. Suitable nonionic surfactants include the ethylene oxide derivatives of alkylphenols, such as octyl or nonylphenol containing from 10, to 60 moles of ethylene oxide per mole of the phenol, and long chain alcohols, such as dodecyl alcohol containing the same proportion of ethylene oxide. Suitable anionic surfactants include alkyl sulfates, such as lauryl sulfates, and diverse sulfonates such as the esters of sulfonated dicarboxylic acids, especially succinic acid. The ethoxylated nonionic surfactants are preferred.

The emulsifier or surfactant may be present in amounts of from approximately 0.5 to 5 percent by weight, based on the dry weight of the copolymer. It has been found that the inclusion of an emulsifier or surfactant may improve the shelf life of the curable coating composition according to the present invention.

Preferred latex compositions comprise a carboxylated latex, an epoxy resin emulsion containing an organo-soluble or organo-miscible catalyst and a water-soluble catalytic curing agent. The carboxylated latex comprises an interpolymer of at least one vinyl aromatic monomer and at least one ethylenically unsaturated carbonyl-containing monomer. In a preferred form, the interpolymer further comprises a diene monomer.

The ethylenically unsaturated carbonyl-containing monomer may be a monocarboxylic acid, dicarboxylic acid or polycarboxylic acid, such as, for example, acrylic acid, methacrylic acid, fumaric acid, maleic acid, itaconic acid, derivatives thereof and mixtures thereof.

The ethylenically unsaturated carbonyl-containing monomer may be present in amounts of from about 0.5 to about 25 percent by weight, based on the total weight of the thermoplastic resin. Preferably, the ethylenically unsaturated carbonyl-containing monomer is present in amounts of from about 1 to about 5 percent by weight and, more preferably, from about 3 to about 5 percent by weight, based on the total weight of the thermoplastic resin.

The latex may comprise an additional ethylenically unsaturated monomeric component or components such as, for example, but not limited to, methyl methacrylate, ethyl acrylate, butyl acrylate, hexyl acrylate, 2-ethylhexyl acrylate, lauryl methacrylate, phenyl acrylate, acrylonitrile, methacrylonitrile, ethylchloroacrylate, diethyl maleate, polyglycol maleate, vinyl chloride, vinyl bromide, vinylidene chloride, vinylidene bromide, vinyl methyl ketone, methyl isopropenyl ketone and vinyl ethylester. Derivatives thereof or mixtures thereof may be included.

The latex may comprise a styrene/butadiene/acrylic acid copolymer or a styrene/butadiene/hydroxyethylacrylate/itaconic acid copolymer. The latex may also include a mixture of copolymers. A mixture of styrene/butadiene/acrylic acid and styrene/butadiene/hydroxyethylacrylate/itaconic acid polymers in approximately equal amounts by weight may be used.

The epoxy resin component is suitably any compound which possesses more than one 1,2-epoxy group. In general, the epoxy resin component is a saturated or unsaturated aliphatic or cycloaliphatic, aromatic or heterocyclic compound and can be substituted or unsubstituted. The epoxy resins may be selected from the polyglycidyl ethers of bisphenol compounds, the polyglycidyl ethers of a novolac resin, and the polyglycidyl ethers of a polyglycol. Mixtures of two or more epoxy resins may also be used.

The preferred epoxy resins are the polyglycidyl ethers of bisphenol compounds and may be formed as the reaction products of epichlorohydrin and bisphenol A or bisphenol F or derivatives thereof. The level of epoxy resin employed will vary over a wide range depending upon the properties of the final product required, as well as the types of epoxy resin and carboxylic acid used. The epoxy resin component of the curable latex composition may further include an emulsifier or surfactant such as, for example, an anionic or nonionic surfactant, although nonionic surfactants are preferred and an ethoxylated nonionic surfactant is more preferred such as Capcure™ 65 which is supplied by Diamond Shamrock.

The emulsifying agent or surfactant may be present in amounts of from about 5 to about 10 percent by weight, based on the weight of the epoxy resin. Preferably, the emulsifying agent or surfactant is present in amounts of from aboutat least 8 percent by weight.

The epoxy resin emulsion component of the latex composition comprises an organo-soluble or organo-miscible catalyst. Suitable organo-soluble or organo-miscible catalysts include the phosphonium salts, such as, for example, ethyltriphenyl phosphonium acetate and ethyltriphenyl phosphonium phosphate and the quaternary ammonium salts, such as, for example, alkylbenzyl dimethyl ammonium chloride, benzyltrimethyl ammonium chloride, methyltrioctyl ammonium chloride, tetraethyl ammonium bromide, N-dodecyl pyridinium chloride and tetraethyl ammonium iodide. The preferred organo-soluble or organo-miscible catalysts are ethyltriphenyl phosphonium acetate, ethyltriphenyl phosphonium phosphate and methyltrioctyl ammonium chloride. Ethyltriphenyl phosphonium phosphate, if not readily available, can be manufactured from the reaction of ethyltriphenyl phosphonium acetate with phosphoric acid.

The organo-soluble or organo-miscible catalyst may be present in an amount of from about 0.1 to about 10.0 percent, preferably from about 0.3 to about 2.0 percent, by weight, based on the weight of the epoxy resin.

Suitable curable latex compositions and, in particular, carboxylated styrene butadiene latex systems for use as the foam backing layer of the present invention are described, for example, by Helbling in U.S. Pat. No. 4,857,566, the disclosure of which is incorporated herein by reference, and are also available from The Dow Chemical Company. Carboxylated latex systems are preferred because, surprisingly, such systems have been discovered to show unexpected levels of adhesiveness to impervious polyolefin polymer layers. The level of this adhesiveness allows the elimination of additional adhesive materials to integrate cured foamed backings to suitable top layers.

One suitable curable latex composition is based on a carboxylated styrene butadiene interpolymer filled with expandable microspheres containing a chemical blowing agent or a volatile compound such as, for example, isobutane. However, when foaming is accomplished by the use of expandable microspheres, additional procedures and techniques may be required to avoid irregular or objectionable foam surfaces (e.g. "mooning"). Such additional procedures and techniques may include, for example, the utilization of an in-mold foaming technique.

Particularly for textile substrate layers, inorganic fillers such as calcium carbonate and aluminum trihydrate may be added to the latex composition. However, for polyolefin polymer substrate layers (as opposed to textile substrate layers), preferably, at least one organic or polymeric filler such as, for example, high density polyethylene powder (e.g., 40 mesh, that is less than 150 microns to facilitate processability) is added to the latex composition for improved resiliency and strength. Other polymers in powder form that are thought to be suitable as fillers for the latex compositions include, but are not limited to, medium density polyethylene (MDPE), linear low density polyethylene (LLDPE), ultra low density polyethylene, homogeneously branched linear polymers, substantially linear ethylene polymers (as well as grafts of such ethylene polymers such as, for example, maleic anhydride grafted high density polyethylene, maleic anhydride grafted linear low density polyethylene and other examples described, for example, in U.S. Pat. Nos. 4,966,810; 4,9247,888; 4,762,860; 5,089,556; 4,739,017; 4,950,541; 5,346,963, the disclosures of which are incorporated herein by reference), ethylene interpolymers (such as ethylene acrylic acid interpolymers, ethylene methacrylic acid interpolymers, ethylene methyl methacrylate interpolymers, ethylene vinyl acetate interpolymers, ethyle2ne ethyl acrylate copolymers, and the like), polypropylene, polycarbonate, polyamide, polystyrene, styrene interpolymers (such as ethylene styrene polymers), ethylene propylene polymers (such as ethylene propylene diene monomer polymers), and epoxy resins.

A foam or froth may be generated by techniques and methods known in the art. Known techniques and methods include, for example, releasing a non-coagulating gas such as nitrogen, or by causing the decomposition of a gas-liberating material which chemically reacts with an ingredient in the mixture and causes the liberation of a non-coagulable gas as a reaction product. The latex composition and solvent dispersed polyolefin polymer composition can also foamed by whipping techniques, air injections techniques, and/or by use of devices equipped with foam heads. Foaming aids (e.g. sodium lauryl sulfate) and foam stabilizers (e.g., potassium oleate) may be added if desired. Preferred additives and stabilizers are non-reactive as to the reactive group of the latex polymer or the co-reactive materials. Other additives and ingredients such as soaps, emulsifiers, wetting agents, and surfactants, may also be used, even though they may be reactive to a limited extent.

The frothed mixture may be poured into molds, spread on a flat tray or belt, or coated onto substrates. For the purpose of this specification, the term 'substrate' is defined as any material such as polyolefin polymer, cloth, fabric, nonwoven, leather, wood, glass or metal or any form of backing or top structure to which a frothed mixture or foam composition will adhere when applied and cured.

The foam may be applied to the polyolefin polymer or textile substrate prior to drying and curing. A typical froth formed from the continuous foam will have a density in the range of from approximately 200 to 500 grams per liter in its wet state, preferably approximately 400 grams per liter. The foam may be applied to the substrate utilizing a doctor blade.

Once formed, the foam may be dried and cured at a temperature of approximately 110 to 150° C. The drying and curing may be undertaken in a forced air circulation oven. The internal temperature of the oven should be maintained preferably at or above approximately 120° C.

In another embodiment of the invention, the resilient cushion foam backing is provided by melt processing and chemically blowing a polyolefin polymer such as, for example, at least one substantially linear ethylene polymer as described by Lai et al. in U.S. Pat. Nos. 5,272,236 and 5,278,272, the disclosures of which are incorporated herein by reference.

Suitable melt processing-foaming techniques for the polyolefin polymer include roll milling, Haake torque mixing, kneadering, calendaring, extrusion casting and hot blown film fabrication wherein prior to the melt processing, the polyolefin polymer is compounded with about 0.5 to about 5 weight percent, preferably about 1 to about 3.5 weight percent of a suitable chemical blowing agent such as, for example, but not limited to, azodicarbonamide, with or without a suitable kicker such as a metal oxide (e.g., zinc oxide) and without a foam stabilizer, such as, for example, sodium sulphosuccinimate, as is typically required for aqueous latex foams.

The following describes the processing temperature range that should be used when using various equipment as either a melt feeder pre-processing device or as stand-alone melt processing equipment. When using kneaders and internal mixers such as Haake torque mixers and Brabender, polyolefin processing temperatures should be maintained at from about 150° to about 180° C. When using compounding extruder whether twin screw extruder or single screw extruder, polyolefin processing temperatures should be maintained at from about 170° to about 190° C. When using two-roll mills, polyolefin processing temperatures should be maintained at from about 160° to about 190° C. Residence times should be maintained at a minimum and where residence time is extended such as, for example, in excess of 45 minutes, additional additive stabilization may be requirement to maintain polymer performance attributes.

For melt processing by 2–4 roll calendering, friction ratios similar to PVC should be employed such as, for example, friction ratios from about 1:1 to about 1:3, preferably from about 1:1 to about 1:2. The calender temperature should be maintained at from about 150° to about 170° C. and the last calender roll should be set to provide the lowest processing temperature. Also, a minimum distance should be set between the last calender roll and stripper rolls.

Additional details for preparing resilient foams based on melt processing of substantially linear ethylene polymers are described by Park et al. in U.S. Pat. No. 5,288,762, the disclosure of which is incorporated herein by reference. However, preferred melt processed polyolefin polymer foams are microcellular. That is, the foam is characterized as having cell sizes of from about 5 to about 100 microns, preferably less than about 70 microns, more preferably less than about 50 microns; a foam density of from about 25 to about 50 lbs./ft$^3$, preferably less than about 40 lbs./ft$^3$; and an open cell content of from about 15 to about 100 percent, preferably equal to or greater than about 50 percent, more preferably equal to or greater than about 75 percent. Preferred melt processed microcellular foams comprises at least one substantially linear ethylene polymer can be used as at least one foam backing layer in a multi foam backing layer product as well as a foamed print layer.

In preparing microcellular foams, melt processing by cast extrusion generally provides lower foam densities and slightly larger cell sizes relative to blown film extrusion. Further, blown film extrusion generally requires a higher polymer density to maintain small cell size and roll milling generally provides the smallest cell sizes and the least cell size variability. As such, the preferred melt process for preparing microcellular polyolefin polymer foams is a roll mill or calender equipment.

Also, the polyolefin polymer foam may be crosslinking (whether microcellular or not) by various methods such as those described in U.S. Pat. No. 5,288,762 and by C. P. Park in "Polyolefin Foam," Handbook of Polymer Foams and Technology Chapter 9, Hanser Publishers, New York (1991), which is incorporated herein by reference. Suitable crosslinking methods include adding a crosslinking agent (e.g., dicumyl peroxide) to the polyolefin polymer prior to extrusion or by irradiating the pollolefin polymer prior to or after foaming or by using an extruder in the melt processing which has a long-land die such as described in GB Patent No. 2,145,961A, the disclosure of which is also incorporated herein by reference, to effectuate thermal oxidative crosslinking.

In another embodiment, the resilient cushion foam backing is provided by mechanically foaming a solvent dispersed polyolefin polymer wherein the polyolefin polymer is, for example, a substantially linear ethylene polymer as described by Lai et al. in U.S. Pat. Nos. 5,272,236 and 5,278,272. Suitable methods for preparing the solvent dispersed, preferably aqueous dispersed, polyolefin polymer systems are described hereinabove in reference to the transparent upper wear layer.

After the polyolefin polymer or latex composition is suitably foamed, the foam sheet is then heat or adhesive laminated to the top structure or to an optional intermediate layer. However, alternatively, the polyolefin polymer can be compounded with chemical blowing agent and other suitable additives and melt processed (and optionally crosslinked) at temperatures below the decomposition temperature of the chemical blowing agent (e.g., at extrusion compounding or roll milling melt temperature less than about 120° C.) and fabricated into a compact sheet. This compact sheet can then be laminated to, for example, an optional intermediate layer, wherein the compact sheet is subsequently foamed by exposure to temperatures at or above the decomposition temperature the chemical blowing agent.

The top structure consisting of a transparent wear layer and polymeric print layer without an optional intermediate reinforcement layer has a thickness in the range of from about 50 to about 800 microns, preferably of from about 80 to about 200 microns and comprises at least one polyolefin polymer either as or in the transparent upper wear layer or the print layer or both. The optional intermediate reinforcement layer of the top structure has a thickness in the range of from about 5 to about 500 micron, preferably of from about 100 to about 300 microns. The optional intermediate layer when at least one melt processed polyolefin polymer is used may also filled with organic or polymeric fillers and may also contain a small amount of a chemical blowing agent and other additives such as a processing aid (e.g. calcium stearate) and a foam deactivator (e.g., a triazole).

The foam cushion backing layer and the intermediate reinforcement layer as well as the transparent upper wear layer, print layer and the intermediate reinforcement layer are integrated with each other by suitable lamination techniques. The foam cushion back layer and the intermediate reinforcement layer can be integrated with or without the use of an intermediate material such as, for example, a nonwoven glass fleece material to add additional dimensional stability to the structure. The transparent upper wear layer, print layer and intermediate reinforcement layer can be integrated by heat and/or pressure lamination techniques as well as by an adhesive lamination technique such as by applying a liquid coating of an aqueous dispersion of an ethylene acrylic acid copolymer, a polyethylene imide adhesive or an urethane adhesive and evaporating the solvent or water. Another suitable lamination technique is the use of double sided adhesive tape such as, for example, Scotch Brand Tape 415 available from 3M Corporation.

The transparent upper wear layer itself can be prepared using several different product and application technologies such as by fabricating an extrusion cast film of a polyolefin polymer or by fabricating a biaxially oriented cast or blown film or sheet (such as, for example oriented polypropylene) and laminating the prefabricated sheet or film to the optional intermediate reinforcement layer or the print layer. An alternative method includes liquid coating a solvent dispersed polyolefin polymer directly onto the optional intermediate reinforcement layer or print layer and subsequently evaporating the solvent.

The polymeric print layer can be manufactured from any melt processing technique, however, preferably the print layer is prepared using a calendaring process and then is heated laminated to the intermediate reinforcement layer. A suitable design can be conveniently imparted to the print layer after it is laminated to the intermediate reinforcement layer but before it is laminated to the upper transparent wear layer. Preferably, the transparent upper wear layer is heat laminated to the polymeric print layer where the print layer comprises a chemical blowing agent compounded into a polyolefin polymer and heat applied during the lamination is sufficiently above the decomposition temperature of the chemical blowing agent such that chemical embossing of the print layer occurs. Alternatively, the print design can be reversed printed on the wear layer which is then heat laminated onto a smooth, unicolor print layer; that is, the print layer in this case essentially provides a background for the print design rather than actually containing the design itself.

The polyolefin polymer for use as the foam backing layer can be an ethylene α-olefin interpolymer having a high comonomer content wherein the crystallinity of the polymer (as measured by known X ray diffraction techniques or differential scanning calorimetry (DSC) techniques such as in using, for example, a Perkin-Elmer DSC7) is equal to or less than about 40 percent, preferably equal to or less than about 30 percent, more preferably equal to or less than about 20 percent, and most preferably equal to or less than about 15 percent. Suitable polyolefin polymers include ethylene polymers such as substantially linear ethylene polymers (which are sold under the designation of AFFINITY and ENGAGE resins by The Dow Chemical Company and Dupont Dow Elastomers, respectively), homogeneously branched linear ethylene polymers (which are sold under the designation of TAFMER and EXACT resins by Mitsui Chemical Corporation and Exxon Chemical Corporation, respectively), heterogeneously branched linear ethylene polymer (such as those sold under the designation of ATTANE and DOWLEX by The Dow Chemical Company and under the designation of FLEXOMER by Union Carbide Corporation) and ethylene/propylene interpolymers (such as those sold under the designation of VISTALON by Exxon Chemical Corporation).

Particularly preferred polyolefin polymers for use in the top layer and foam layer of the present invention are substantially linear ethylene polymers due their improved melt extrusion processability and unique rheological properties as described by Lai et. al in U.S. Pat. Nos. 5,272,236 and 5,278,272, the disclosures of which are incorporated herein by reference.

The term "melt processing" as used herein refers to processing or working a polymer composition at temperatures elevated above its melting point in an extruder, calender, Haake mixer, Banbury, Henschel mixer, Brabender mixer, or Buss mixer.

The term "homogeneously branched linear ethylene polymer" is used in the conventional sense in reference to a linear ethylene interpolymer in which the comonomer is randomly distributed within a given polymer molecule and wherein substantially all of the polymer molecules have the same ethylene to comonomer molar ratio. The terms refer to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and essentially lack a measurable high density (crystalline) polymer fraction.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., *journal of Polymer Science, Poly. Phys. Ed.*, Vol. 20, p. 441 (1982), or in U.S. Pat. No.

4,798,081, or by L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}C$ NMR analysis in accordance with techniques described in U.S. Pat. No. 5,292,845 and by J. C. Randall in Rev. Macromol. (Chem. Phys., C29, pp. 201–317, the disclosures of both of which are incorporated herein by reference.

In addition to referring to a homogeneous (or narrow) short branching distribution, the term "homogeneously branched linear ethylene interpolymer" also means the interpolymer does not have long chain branching. That is, the ethylene interpolymer has an absence of long chain branching and a linear polymer backbone in the conventional sense of the term "linear." However, he term "homogeneously branched linear ethylene polymer" does not refer to high pressure branched polyethylene which is known to those skilled in the art to have numerous long chain branches. Homogeneously branched ethylene polymers can be made using polymerization processes (e.g., those described by Elston in U.S. Pat. No. 3,645,992) which provide a uniform (narrow) short branching distribution (i.e., homogeneously branched). In his polymerization process, Elston uses soluble vanadium catalyst systems to make such polymers, however others such as Mitsui Chemical Corporation and Exxon Chemical Corporation have used so-called single site catalyst systems to make polymers having a similar homogeneous structure. Homogeneously branched linear ethylene polymers can be prepared in solution, slurry or gas phase processes using hafnium, zirconium and vanadium catalyst systems. Ewen et al. in U.S. Pat. No. 4,937,299 describe a method of preparation using metallocene catalysts. The disclosures of Elston and Ewen et al. are incorporated herein by reference.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than about 50 percent and more typically less than about 30 percent.

Heterogeneously branched ethylene polymers are well known among practitioners of the linear polyethylene art. Heterogeneously branched ethylene polymers are prepared using conventional Ziegler-Natta solution, slurry or gas phase polymerization processes and coordination metal catalysts as described, for example, by Anderson et al. in U.S. Pat. No. 4,076,698, the disclosure of which is incorporated herein by reference. These conventional Ziegler-type linear polyethylenes are not homogeneously branched, do not have any long-chain branching and have a linear polymer backbone in the conventional sense of the term "linear." Also, heterogeneously branched ethylene polymers do not show any substantial amorphism at lower densities since they inherently posses a substantial high density (crystalline) polymer fraction. At densities less than 0.90 g/cc, these materials are more difficult to prepare than homogeneously branched ethylene polymer and are also more difficult to pelletize than their higher density counterparts. At such lower densities, heterogeneously branched ethylene polymer pellets are generally more tacky and have a greater tendency to clump together than their higher density counterparts.

The term "ethylene/propylene interpolymer" as used herein refers to polymer having at least ethylene and propylene interpolymerized therein. Such interpolymer may have a higher ethylene content than propylene and vice versa and include other monomers such as, for example, at least one diene or at least other α-olefin.

Typically, the homogeneously branched linear ethylene polymer and the heterogeneously branched ethylene polymer are ethylene/α-olefin interpolymers, wherein the α-olefin is at least one $C_3-C_{20}$ α-olefin (e.g., propylene, 1-butene, 1-pentene, 4-methyl-1-pentene, 1-hexene, 1-octene and the like) and preferably the at least one $C_3-C_{20}$ α-olefin is 1-hexene. Most preferably, the ethylene/α-olefin interpolymer is a copolymer of ethylene and a $C_3-C_{20}$ α-olefin, especially an ethylene/$C_4-C_6$ α-olefin copolymer and most especially an ethylene/1-hexene copolymer.

The term "substantially linear ethylene polymer" as used herein refers to homogeneously branched ethylene/α-olefin interpolymers that have a narrow short chain branching distribution and contain long chain branches as well as short chain branches attributable to homogeneous comonomer incorporation. The long chain branches are of the same structure as the backbone of the polymer and are longer than the short chain branches. The polymer backbone of substantially linear α-olefin polymers is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached. Long chain branches are obviously of greater length than of short chain branches resulting from comonomer incorporation.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297).

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17,1301 (1949) and Rudin, A., *Modern Methods of Polymer Characterization*, John Wiley & Sons, New York (1991) pp. 103–112.

A. Willem degroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene interpolymers. In particular, degroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, degroot and Chum showed that GPC-DV may be used to quantify the level of long chain branches in substantially linear ethylene/octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

The substantially linear ethylene polymers used in the present invention are a unique class of compounds that are further defined in U.S. Pat. No. 5,272,236, Ser. No. 07/776, 130 filed Oct. 15, 1991 and in U.S. Pat. No. 5,278,272, Ser. No. 07/939,281 filed Sep. 2, 1992, each of which is incorporated herein by reference.

Substantially linear ethylene polymers differ significantly from the class of polymers conventionally known as homogeneously branched linear ethylene polymers described, for example, by Elston in U.S. Pat. No. 3,645,992, in that substantially linear ethylene polymers do not have a linear polymer backbone in the conventional sense of the term "linear." Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698, in that substantially linear ethylene interpolymers are homogeneously branched interpolymers. Substantially linear ethylene polymers also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalysts systems.

Single site polymerization catalyst, (for example, the monocyclopentadienyl transition metal olefin polymerization catalysts described by Canich in U.S. Pat. No. 5,026, 798 or by Canich in U.S. Pat. No. 5,055,438) or constrained geometry catalysts (for example, as described by Stevens et al. in U.S. Pat. No. 5,064,802) can be used to prepare substantially linear ethylene polymers, so long as the catalysts are used consistent with the methods described in U.S. Pat. No. 5,272,236 and in U.S. Pat. No. 5,278,272. Such polymerization methods are also described in PCT/US 92/08812 (filed Oct. 15, 1992). However, the substantially linear ethylene polymers are preferably made by using suitable constrained geometry catalysts, especially constrained geometry catalysts as disclosed in U.S. Application Ser. Nos. 545,403, filed Jul. 3, 1990; U.S. Pat. No. 5,132, 380; U.S. Pat. No. 5,064,802; U.S. Pat. No. 5,153,157; U.S. Pat. No. 5,470,993; U.S. Pat. No. 5,453,410; U.S. Pat. No. 5,374,696; U.S. Pat. No. 5,532,394; U.S. Pat. No. 5,494,874; U.S. Pat. No. 5,189,192; the teachings of all of which are incorporated herein by reference.

Suitable cocatalysts for use herein include but are not limited to, for example, polymeric or oligomeric aluminoxanes, especially methyl aluminoxane or modified methyl aluminoxane (made, for example, as described in U.S. Pat. No. 5,041,584, U.S. Pat. No. 4,544,762, U.S. Pat. No. 5,015,749, and/or U.S. Pat. No. 5,041,585, the disclosures of which are incorporated herein by reference) as well as inert, compatible, non-coordinating, ion forming compounds. Preferred cocatalysts are inert, non-coordinating, boron compounds.

The polymerization conditions for manufacturing the substantially linear ethylene polymers used in the present invention are preferably those useful in the continuous solution polymerization process, although the application of the present invention is not limited thereto. Continuous slurry and gas phase polymerization processes can also be used, provided the proper catalysts and polymerization conditions are employed. To polymerize the substantially linear polymers useful in the invention, the single site and constrained geometry catalysts mentioned earlier can be used, but for substantially linear ethylene polymers the polymerization process should be operated such that substantially linear ethylene polymers are indeed formed. That is, not all polymerization conditions inherently make the substantially linear ethylene polymers, even when the same catalysts are used. For example, in one embodiment of a polymerization process useful in making substantially linear ethylene polymers, a continuous process is used, as opposed to a batch process.

The substantially linear ethylene polymer for use in the present invention is characterized as having (a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 150° C., and (e) a short chain branching distribution index greater than about 50 percent.

The substantially linear ethylene polymers used in this invention are homogeneously branched interpolymers and essentially lack a measurable "high density" fraction as measured by the TREF technique (i.e., have a narrow short chain distribution and a high SCBD index). The substantially linear ethylene polymer generally do not contain a polymer fraction with a degree of branching less than or equal to 2 methyls/1000 carbons. The "high density polymer fraction" can also be described as a polymer fraction with a degree of branching less than about 2 methyls/1000 carbons.

The substantially linear ethylene interpolymers for use in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" is used herein to indicate a copolymer, or a terpolymer, or the like, where, at least one other comonomer is polymerized with ethylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99. GER experiments are performed at a temperature of about 190° C., at nitrogen pressures between about 250 to about 5500 psig using about a 0.0754 mm diameter, 20:1 L/D die with an entrance angle of about 180°. For the substantially linear ethylene polymers described herein, the PI is the apparent viscosity (in kpoise) of a material measured by GER at an apparent shear stress of about $2.15 \times 10^6$ dyne/cm$^2$. The substantially linear ethylene polymer for use in the invention are ethylene interpolymers having a PI in the range of about 0.01 kpoise to about 50 kpoise, preferably about 15 kpoise or less. The substantially linear ethylene polymers used herein have a PI less than or equal to about 70 percent of the PI of a linear ethylene interpolymer (either a conventional Ziegler polymerized interpolymer or a linear homogeneously branched interpolymer as described by Elston in U.S. Pat. No. 3,645, 992) having an $I_2$, $M_w/M_n$ and density, each within ten percent of the substantially linear ethylene interpolymer.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers is at least about 50 percent greater than the critical shear rate at the onset of surface melt fracture of a linear ethylene interpolymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and maximum wear layer scratch and abrasion properties, surface defects should be minimal, if not absent. The critical shear stress at the onset of gross melt fracture for the substantially linear ethylene interpolymers used in the invention, that is those having a density less than about 0.91 g/cc, is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER. Preferably, in the present invention, the substantially linear ethylene polymer will be characterized by its critical shear rate, rather than its critical shear stress.

Substantially linear ethylene polymers also consist of a single polymer component material and are characterized by a single DSC melting peak. The single melting peak is determined using a differential scanning calorimeter standardized with indium and deionized water. The method involves about 5–7 mg sample sizes, a "first heat" to about 140° C. which is held for about 4 minutes, a cool down at about 10°/min. to about −30° C. which is held for about 3 minutes, and heat up at about 10° C./min. to about 180° C. for the "second heat". The single melting peak is taken from the "second heat" heat flow vs. temperature curve. Total heat of fusion of the polymer is calculated from the area under the curve.

For substantially linear ethylene interpolymers having a density of about 0.875 g/cc to about 0.91 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for other homogeneously branched polymers such as EXACT resins and is discerned on the basis of the slope of the single melting peak varying monotonically through the melting region of the artifact. Such an artifact occurs within about 34° C., typically within about 27° C., and more typically within about 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel. permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a*(M_{polystyrene})b.$$

In this equation, a=0.4316 and b=1.0. Weight average molecular weight, $M_w$, is calculated in the usual manner according to the following formula: $M_j = (\Sigma w_i(M_i^j))j$; where $w_i$ is the weight fraction of the molecules with molecular weight $M_i$ eluting from the GPC column in fraction i and j=1 when calculating $M_w$, and j=−1 when calculating $M_n$.

For the homogeneously branched ethylene interpolymers used in the present invention, the $M_w/M_n$ is preferably less than about 3, more preferably less than about 2.5, and especially from about 1.5 to about 2.5 and most especially from about 1.8 to about 2.3.

Substantially linear ethylene polymers are known to have excellent processability, despite having a relatively narrow molecular weight distribution (that is, the $M_w/M_n$ ratio is typically less than about 3.5, preferably less than about 2.5, and more preferably less than about 2). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the preferred ethylene α-olefin polymer for use in the present invention is a substantially linear ethylene polymer.

The density of the polyolefin polymer (as measured in accordance with ASTM D-792) for use in the present invention is generally greater than about 0.850 g/cc, especially from about 0.860 g/cc to about 0.930 g/cc, more preferably, from about 0.880 g/cc to about 0.920 g/cc and most preferably, from about 0.880 to about 0.910 g/cc. When used as or in the foam layer, the preferred polymer density of the polyolefin polymer is less than or equal to about 0.915 g/cc, especially less than or equal to about 0.9 g/cc. WI:en used as or in the upper wear layer and print layer, the preferred polymer density of the polyolefin polymer is greater than or equal to about 0.91 g/cc, especially greater than or equal to about 0.92 g/cc.

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The melt index for the polyolefin polymers useful herein is generally from about 0.01 g/10 min. to about 200 g/10 min., preferably from about 0.01 g/75 min. to about 10 g/10 min., especially from about 0.1 g/10 min. to about 20 g/10 min., and most especially from about 1 g/10 min. to about 10 g/10 min. However, generally lower a lower melt index will be preferred for the upper wear layer and print layer relative to the foam layer.

Other measurements useful in characterizing the molecular weight of substantially linear ethylene interpolymers and homopolymers involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I10/I_2$. For the substantially linear ethylene polymers used to prepare the films of the present invention, the melt flow ratio indicates the degree of long chain branching, i.e., the higher the $I_{10}/I_2$ melt flow ratio, the more long chain branching in the polymer. The $I_{10}/I_2$ ratio of the substantially linear ethylene polymers is preferably at least about 7, and especially at least about 9.

Additives such as antioxidants (e.g., hindered phenolics (such as Irganox® 1010 or Irganox® 1076), phosphites (e.g., Irgafos® 168), and PEPQ™ (a trademark of Sandoz Chemical, the primary ingredient of which is believed to be a biphenylphosphonite) as well FR additives (e.g., antimony, magnesium hydroxide and aluminum trihydroxide (ATH)), pigments, colorants, fillers (e.g., $CaCO_3$), and the like can also be included in the polyolefin polymers, to the extent that they do not interfere with the abuse, transparency or foam properties required by Applicants. However, with respect to antioxidants and stabilizers, only nominal quantities such as 100 to 2500 ppm will generally be required to successfully melt process the preferred polyolefin polymers used in the present invention.

Fabricated layers such as for lamination operations may also contain additives to enhance handling, antiblocking and coefficient of friction characteristics including, but not limited to, untreated and treated silicon dioxide, talc, calcium carbonate, and clay, as well as primary and secondary fatty acid amides, silicone coatings, etc. Still other additives, such as quaternary ammonium compounds alone or in combination zeith ethylene acrylic acid (EAA) copolymers or other functional polymers, commercial anti-stat additives (e.g., HOSTASTAT available from Hoechst Celanese, IRGASTAT available from Ciba Geigy and ATMER available from ICI) and hydrophobic fillers such as, for example, talc can also be added to the polyolefin polymer for the purpose of meeting surface and volume resistivity standards.

Also various oils can be compounded into the polyolefin polymer to reduce formulation costs, enhance flexibility and filler acceptability and/or to reduce dusting during compounding. Suitable oils include, for example, paraffinic and hydrogenated oils (e.g., SUNPAR available from Sun Oil Company and MEDINOL available from Witco) although naphthenic and aromatic oils may also be used. In general, the amount of oil that can be successfully added without incurring signs of incompatibility such as, for example, bleed-out, will increase as the viscosity of the oil decreases and/or the crystallinity of the polyolefin polymer decreases.

The polyolefin polymer used in the invention can be a blend or mixture of at least one polyolefin polymer and at least one other polymer wherein the blend or mixture is formed by any convenient method, including dry blending the individual polymers and subsequently melt mixing in a mixer or by mixing the polymers together directly in a mixer (e.g., a Banbury mixer, a Haake mixer, a Brabender internal mixer, or a single or twin screw extruder including a compounding extruder and a side-arm extruder employed directly down stream of a interpolymerization process).

Such blends or mixtures can also be formed in-situ via multiple reactor interpolymerizations with the reactors can be operated sequentially in series or in parallel. For example, an interpolymerization of ethylene and the desired alpha-olefin using a constrained geometry catalyst in at least one reactor and a constrained geometry catalyst or a Ziegler-type catalyst in at least one other reactor. An exemplary in-situ interpolymerization process is disclosed in PCT Patent Application 94/01052, incorporated herein by reference.

The presently claimed multilayer resilient flooring and wall covering product and method for preparing the same are more fully described in the following examples, but are not limited to the examples shown. The homogeneously branched substantially linear ethylene polymers used in the following examples were prepared according to procedures and techniques described in the Examples of U.S. Pat. Nos. 5,272,236 and 5,278,272.

EXAMPLES

Preparation of Foam Backing Layer

In an evaluation to prepare a foam backing using a polyolefin polymer (Example 1A), a substantially linear ethylene/1-octene copolymer having a density of about 0.902 g/cc and an ASTM D-1238, Condition 190° C./3.0 kg $I_2$ melt index of about 3 g/10 min and sold by The Dow Chemical Company under the designation of AFFINITY FW 1650 was melt compounded on a 30 mm co-rotating, 30:1 L/D Werner-Pflieder twin screw extruder with 3.0 parts per hundred (pph) of SAFOAM FPE-50, an azodicarbonamide blowing agent supplied by Reedy International Corporation. The extruder was connected to a transfer line which was attached to a conventional gear pump which was then connected to a 8 inch cast sheet die which produced a foam sheet. The resultant foam sheet had a thickness of about 1 mm and a foam density of about 439 grams/liter (g/l). The average foam cell size was about 55 microns and the foam was characterized as having about 87% recovery of original thickness upon indentation in accordance with EN433. This polyolefin polymer foam backing was subsequently heat laminated to a suitable top layer structure prepared as described below.

Another evaluation essentially repeating Example 1A above except the melt compounded composition of the polyolefin polymer and the blowing agent was transferred to a 1 inch blow film unit instead of to a cast sheet die. In this evaluation, the resulting foam sheet (Example 1B) had a thickness of about 0.58 mm, a foam density of about 631 g/l, an average foam cell size of about 41 microns and an indentation recovery of original thickness of about 91 percent as measured in accordance with EN433.

For other melt processed foam backing evaluations, Table 1 below shows melt processed foam backing Examples 1A and 1B as well as Examples 1C–1I. Similarly, Table 2 shows the corresponding melt processing data for Examples 1C–1G and Table 3 shows their respective performance data (i.e., percent indentation recovery, percent dimensional stability and bending resistance).

TABLE 1

| Example | Melt Processing Equipment | Resin Density, g/cc | Resin $I_2$, g/10 min | Safoam FPE-50, pph | Other Additives, pph | Foam Density, grams/liter | Foam Thickness, mm | Cell Size, microns | Cell Size Range, microns |
| --- | --- | --- | --- | --- | --- | --- | --- | --- | --- |
| 1A | 8" Cast Sheet Die | 0.902 | 3.0 | 3.0 | None | 439 | 0.99 | 55 | 18–164 |
| 1B | 1" Blown Film Line | 0.902 | 3.0 | 3.0 | None | 631 | 0.58 | 41 | 14–68 |
| 1C | 8" Cast Sheet Die | 0.87 | 5.0 | 3.0 | None | 479 | 1.07 | 53 | 9–89 |
| 1D | 8" Cast Sheet Die | 0.87 | 5.0 | 3.0 | 0.5 dicumyl peroxide | 607 | 1.02 | 69 | 17–86 |
| 1E | Cast Sheet Rollers | 0.87 | 5.0 | 3.0 | 0.5 dicumyl peroxide | 607 | 0.76 | 18 | 5–37 |
| 1F | 8" Cast Sheet Die | 0.935 | 2.5 | 3.0 | None | 604 | 0.99 | 68 | 54–81 |
| 1G | 8" Cast Sheet Die | 0.908 | 0.7 | 3.0 | None | 472 | 0.89 | 194 | 97–290 |
| 1H | 1" Blown Film Line | 0.87 | 5.0 | 3.0 | 0.5 zinc oxide | 540 | 1.02 | 203 | 14–65 |
| 1I | 1" Blown Film Line | 0.87 | 5.0 | 3.0 | None | 620 | 1.09 | 365 | 68–500 |

TABLE 2

| Example | Feed Rate, kg/hr | Extruder Melt Temp, ° C. | Extruder Pressure, psi | Transfer Line Temp, ° C. | Die Pressure, psi | Foaming Temp, ° C. | Cast Roll Inlet Temp, ° C. |
| --- | --- | --- | --- | --- | --- | --- | --- |
| 1A | 5.2 | 178 | 1,500 | 116 | 1,950 | 141 | 16 |
| 1B | 5.2 | 199 | 1,750 | 143 | — | 147 | 10 |
| 1C | 5.2 | 159 | 1,700 | 107 | 1,970 | 139 | 10 |
| 1D | 5.2 | 165 | 1,750 | 116 | 2,100 | 176 | 10 |
| 1E | 5.2 | 165 | 1,750 | 116 | 2,100 | 176 | 10 |
| 1F | 5.2 | 219 | 1,300 | 160 | 1,300 | 209 | 10 |
| 1G | 3.2 | 189 | 1,600 | 132 | 2,050 | 143 | 16 |
| 1H | 5.2 | 193 | 1,100 | 138 | — | 135 | 10 |
| 1I | 5.2 | 191 | 1,400 | 135 | — | 135 | 10 |

TABLE 3

| Example | % Recovery of Original Thickness | Dimensional Stability, % change | | Bending Resistance, mN | |
|---|---|---|---|---|---|
| Test Method | PrEN 433 12/90 | MD | CD | MD | CD |
|  |  | PrEN 433 12/90 | | ISO 2493 | |
| 1A | 87.1 | 0.0 | 0.0 | 179 | 120 |
| 1B | 90.7 | 0.0 | 0.0 | 120 | 120 |
| 1C | 73.4 | −0.8 | 0.8 | 120 | 119 |
| 1D | 77.1 | −6.3 | 0.7 | 120 | 120 |
| 1E | 80.1 | −10.8 | 5.7 | 120 | 120 |
| 1F | 97.5 | 0.0 | 0.0 | 298 | 239 |
| 1G | 90.0 | 0.0 | 0.0 | 239 | 239 |
| 1H | 83.6 | 0.0 | 0.0 | 120 | 120 |
| 1I | 81.0 | 0.0 | −2.3 | 119 | — |

In another evaluation, a foam backing (Example 1J) was prepared using an aqueous latex composition. In this evaluation, about 100 parts by dry weight of a carboxylated styrene butadiene latex, supplied by The Dow Chemical Company under the designation of XZ 92160, was admixed with about 4.6 parts by dry weight of sodium sulphosuccinimate (as a froth stabilizer), about 8 parts by dry weight of paraffin (as a detackifier to help prevent foam cell wall tack), about 100 parts by dry weight of a high density polyethylene powder having about a 40 mesh (as a reinforcing filler for improved resiliency and strength), and about 8 parts by dry weight of an epoxy curing resin. The formulated aqueous dispersion was about 75% solids by weight and its viscosity was adjusted to about 3,000 centipoises (cps) using Viscalex HV-30 which is a polyacrylate thickeners available from Allied Colloids Ltd. The formulated aqueous dispersion was mechanically foamed using air injection and vigorous agitation to reduce the foam density, spread onto the backside of a suitable top layer structure and then dried in an air forced oven at 140° C. for about 20 minutes to allow complete curing.

In another evaluation to prepared a foam backing (Example 1K) based on a latex composition, about 100 parts by dry weight of the same carboxylated styrene butadiene latex as used for Example 1J was admixed with about 4 parts by dry weight of sodium sulphosuccinimate, about 20 parts by dry weight of Expancel microspheres containing isobutane as supplied by Nobel Industries Sweden, about 50 parts by dry weight of a high density polyethylene resin ground to a 40 mesh 10 powder, and 8 parts by dry weight of an epoxy curing resin. The formulated aqueous dispersion was about 65% solids by weight and its viscosity was adjusted to about 3,000 cps using Viscalex HV-30. This formulated latex composition was doctored onto the backside of a suitable top layer structure and then placed in an air forced oven at 140° C. for about 20 minutes wherein the isobutane blowing agent was released and caused foaming and the foamed backing was ultimately cured.

In another evaluation to determination the performance attributes of a carboxylated latex composition on a textile substrate layer and polyolefin polymer was investigated. The following materials were employed and formulated as shown in Tables 4 and 5 below.

| Materials employed | |
|---|---|
| Epoxy Resin RTC 7-15445-9A | experimental aqueous epoxy resindispersion supplied by The Dow Chemical Company |
| Catalyst | ethyl triphenyl phosphonium acid acetate |
| Latex - XZ 92160 | a copolymer of 32 wt % styrene, 65 wt. butadiene and 3 wt. % acrylic acid supplied by The Dow Chemical Company |
| Impermax 888/2 | a paraffin wax emulsion supplied by Govi N.V. |
| Empimen MKB | sodium sulphosuccinimate ex Albright and Wilson (UK) |
| HDPE | High Density Polyethylene ex The Dow Chemical Company |
| BL 200 | a CaCO₃ filler supplied by Omya |
| Viscalex ™ HV-30 | an acrylic thickener supplied by Allied Colloids LTD |
| Emulsion L | an antioxidant dispersion supplied by Great Lakes |
| Viscalex HV-30 | a polyacrylate thickeners available from Allied Colloids Ltd. |

TABLE 4

Formulation (I) for Polyolefin Polymer Substrate Layer

| Component | Dry parts | Wet parts |
|---|---|---|
| Latex XZ 92160 | 100 | 196 |
| Emulsion 'L' Antioxidant | 15 | 2.6 |
| Catalyst | 0.75 | 2.5 |
| Epoxy Resin 9A | 8 | 17.8 |
| Empimin MKB | 46 | 3.1 |
| Impermax 888/2 | 8.0 | 13.3 |
| HDPF | 50 | 50 |
| Solids | ±68% | |
| pH | ±8 | |
| Viscosity (Brookfield, RVT 4 @ 20 rpm) adjusted using Viscalex HV-30 | ±6,000 cps | |

TABLE 5

Formulation (II) for Textile Substrate Layers

| Component | Dry parts | Wet parts |
|---|---|---|
| Latex XZ 92160 | 100 | 196 |
| Emulsion 'L' Antioxidant | 15 | 2.6 |
| Catalyst | 0.75 | 2.5 |
| Epoxy Resin 9A | 8 | 17.8 |
| Empimin MKB | 4.6 | 13.1 |
| Impermax 888/2 | 8 | 13.3 |

TABLE 5-continued

Formulation (II) for Textile Substrate Layers

| Component | Dry parts | Wet parts |
|---|---|---|
| Calcium Carbonate | 180 | 180 |
| Solids | | ±72% |
| pH | | ±8 |
| Viscosity (Brookfield, RVT 4 @ 20 rpm) | | ±6,000 cps |

The ingredients were mixed with agitation in sequence as listed above. The mixture was passed through a continuous foamer and yielded a froth with a density of 350 grams/liter. The froth was doctored onto a precoated tufted carpet at a thickness of approximately 3.5 mm. The foam was then dried and cured at about 120° C. in a forced air circulation oven.

After cooling and conditioning at 23° C./50% RH for 24 hours, the foam was sliced off the carpet and the performance attributes were measured. Testing was performed in accordance with EN433 for indentation recovery, in accordance with DIN53455 for percent elongation and in accordance with DIN 53571 for tensile strength.

Resiliency was determined using a dropped-ball-rebound method. To determine the percent resiliency of the foam backings, the height of rebound of a steel ball bearing when dropped from a height of 45.7 cm was measured. In the resiliency test, specimens are provided at the same dimensions as is used for foam density determinations. The test apparatus (shown in FIG. I) consisted of an electromagnet which held the ball bearing above the test specimen. The diameter of the ball bearing was 1.588 centimeters and its weight was 16.3 grams. The ball bearing was released into a vertical clear plastic tube graduated in percent. The plastic tube was laid to rest on the specimen to be tested at a force of 100±10 grams wherein the required force was adjusted as necessary using a counter balance assembly situated on a fixed vertical support of the apparatus. To read the percent rebound, the top of the ball bearing on rebound was noted. Thus, in this test zero percent rebound (resiliency) was taken for a height of 1.588 cm and 100 percent rebound (resiliency) was taken for a height of 45.7 cm. Two values were measured and reported for each test specimen. The first value (lower) was the reading from the first drop and the second reading was obtained by dropping the ball at the same spot until the maximum value (equilibrium) was reached which required 5–10 drops. The performance results are shown below in Table 6.

TABLE 6

| Properties | Formulation I polyolefin Polymer | Formulation II Textile | Units |
|---|---|---|---|
| Foam dry density | 0.400 | 0.243 | g.cm$^{-3}$ |
| Tensile strength | 0.094 | 0.063 | N.mm$^{-2}$ |
| Elongation | 170 | 185 | % |
| Gauge retention unaged/aged | 101/98 | 103/92.8 | % |
| Indentation recovery | 97 | 90 | % |
| Resiliency | 27 | 22 | % |

The results in Table 6 indicate that both the carboxylated foam backed polyolefin polymer substrate layer product and the carboxylated foam backed textile substrate layer product meet or exceed performance standards for the heterogeneous flooring market segment.

Preparation of Print Layer

In an evaluation to prepare a print layer (Example 1L) using a polyolefin polymer, about 97.5 parts by weight of a substantially linear/1-octene copolymer having a density of about 0.87 g/cc and an ASTM 1238 I2 melt index of about 1 g/10 minutes and supplied by The Dow Chemical Company under the designation of ENGAGE DSH 8501.00 was dry mixed with about 2.5 parts by weight of Genitron AZ2, an azodicarbonamide chemical blowing agent supplied by Bayer Chemical AG, and about 1.0 parts by weight of zinc oxide. This mixture was melt processed at about 120° C. (i.e., below the decomposition temperature of the blowing agent) for about 5 minutes in accordance to ISO 1163/2 and formed into a sheet which was allowed to cool to room temperature. The sheet was subsequently foamed using a conveyor oven set at about 190° and a traveling speed of about 20 mm/minute wherein foaming started after about 850 seconds and maximum foam expansion was achieved after about 1,160 seconds.

In another evaluation to prepare a foamed print layer (Example 1M), about 100 parts by dry weight of an aqueous dispersion of a substantially linear/1-octene copolymer at about 53 percent solids by dry weight was admixed with about 1 part by dry weight of Celogen AZNP, an azodicarbonamide chemical blowing agent supplied Uniroyal Chemical Company and about 1 part by dry weight of zinc oxide. The copolymer was supplied by The Dow Chemical Company under the designation of XU 58000.52 and was prepared into an aqueous dispersion using the continuous method and procedure described in U.S. Pat. No. 5,539,021 and in copending applications, application Ser. Nos. 08/463,160; 08/630,187; and 08/702,824. The formulated polyolefin polymer dispersion was then cast onto Mylar film and dried at about 68° C. for about 12 hours. The resulting film was characterized as having a modulus of about 7.3 MPa and a percent strain at break of about 1,300. The dried film was conveniently foamed by introducing it to an air forced oven set at about 210° C. for several minutes.

Preparation of Transparent Upper Wear Layer

In an evaluation to prepare a transparent upper wear layer (Example 1N), a substantially linear ethylene/1-octene copolymer having a density of about 0.903 g/cc and an IASTM D-1238, Condition 190° C./2.16 kg I$_2$ melt index of about 1.0 g/10 minute and supplied by The Dow Chemical Company under the designation of AFFINITY PL 1880 was melt processed on a two-roll mill at 160–190° C. for about 10 minutes to achieve a transparent sheet. The resulting sheet was characterized as having an abrasion resistance in accordance with DIN-53516 of about 15 mm$^3$, a haze at 1 mm in accordance with ASTM-D1003-61 of about 68 percent, a visual scratch resistance in accordance with ISO-4586.2 of about 0.1, and a scratch width of about 150 microns. This melt processed transparent upper wear layer was separately heat and pressure laminated or adhesive laminated with double adhesive tape to Example 1L and Example 1M print layers and each laminate was heated and pressure laminated to Example 1A, 1B, 1J and 1K foam backing layers.

Similarly, a biaxial oriented polypropylene film (Example 1O) was heat laminated to print layer Example 1L.

In another evaluation, a polyolefin polymer covering layer (Example 1P) for Example 1N transparent upper wear layer was prepared by coating an aqueous dispersion thereon. The aqueous dispersion, which was about 40 percent solids by dry weight and utilized ammonium hydroxide, was based on an ethylene acrylic acid (EAA) copolymer containing about 20 weight percent acrylic acid and was supplied by Michelman. The dispersion was cast onto the transparent upper wear layer at a wet thickness of about 400 microns and then dried in an air forced oven set at about 140° C. for about 4 minutes. The resulting covered transparent upper wear layer was characterized as having a scratch width measured using a stylus load of 0.5N in accordance with ISO-4586-2, paragraph 14 of about 118 microns and a Taber abrasion mean weight loss after 500 revolutions with a S39 wheel, loaded with a 1 kilogram weight and the grit feeder set to 21 gram of grit/minute in accordance with ASTM F510-93, of about 6.1 mg.

In another covering layer (Example 1Q) evaluation, an aqueous dispersion comprising a 1/1 ratio of about 20 weight percent acrylic acid, about 1300 $I_2$ melt index at 190° C. ethylene acrylic acid (EAA) copolymer and a substantially linear ethylene/1-octene copolymer having a density of about 0.901 g/cc and an $I_2$ melt index of about 16 g/10 minutes at 190° C. was prepared at 50 percent solids by dry weight using potassium hydroxide and conventional dispersion techniques. The resultant aqueous potassium ionomer dispersion was cast onto Example 1N transparent upper wear layer at a wet thickness of about 400 microns and then dried in an air forced oven set about 70° C. for about 15 minutes. The resulting covered transparent upper wear layer was characterized as a having a Taber abrasion mean weight loss after 500 revolutions with a S39 wheel, loaded with a 1 kilogram weight and the grit feeder set to 21 gram of grit/minute in accordance with ASTM F510-93, of about 5.0 mg.

The excellent scratch and abrasion resistance obtained utilizing covering layers based on dispersions of ethylene acrylic acid copolymer having relatively high acrylic acid content and a substantially linear ethylene polymer having a relatively high 1-octene content (and thus relatively low crystallinities) is very surprising. That is, a conventional polyurethane topcoat will show about 14 mg Taber abrasion weight loss under the same test conditions. These results are surprising in that skilled artisans would ordinarily expect polyolefin polymers with low densities and/or high comonomer levels to exhibit excessive weight losses in abrasion testing and certain less abrasion resistance that a polyurethane topcoat.

In another evaluation several different polyolefin polymer compositions were investigated as solid melt processed polymers for use as a transparent upper wear layer in the present invention. Table 7 provides the description of the various polymer compositions and their respective properties:

TABLE 7

| Polyolefin Polymer Composition Test Method | Shore D Hardness DIN-53505 | Polymer Density, g/cc | 2% Modulus, Mpa ASTM-D638 | Scratch Width, microns ISO-4586-2 | Scratch Visual ISO-4586-2 | Abrasion, mm³ DIN-53516 | % Haze at 1 mm ASTM-D1000-61 |
|---|---|---|---|---|---|---|---|
| Example 2A 30% bw Resin A + 70% bw Resin B | 54.3 | 0.901 | 197.3 | 145 | 0.2 | 58 | 81 |
| Example 2B 60% bw Resin A + 40% bw Resin B | 65 | 0.902 | 574.9 | 114 | 0.2 | 63 | 89 |
| Example 2C 30% bw Resin C + 70% bw Resin B | 49.3 | 0.913 | 107.4 | 156 | 0.1 | 28 | 84 |
| Example 2D 60% bw Resin A + 40% bw Resin B | 47.6 | 0.923 | 127.2 | 126 | 0.1 | 38 | 76 |
| Example 2E 30% bw Resin D + 70% bw Resin B | 47.6 | 0.916 | 66.9 | 142 | 0.2 | 33 | 92 |
| Example 2F 60% bw Resin D + 40% bw Resin B | 43.3 | 0.932 | 54.4 | 136 | 0.2 | 80 | 76 |
| Example 2G 30% bw Resin E + 70% bw Resin B | 49.6 | 0.916 | 116.4 | 144 | 0.1 | 44 | 84 |
| Example 2H 60% bw Resin E + 40% bw Resin B | 51.6 | 0.931 | 168.4 | 143 | 0.1 | 65 | 71 |
| Example 2I 100% Resin E | 58 | 0.9501 | 220.4 | 100 | 0.5 | 162 | 44 |
| Example 2H 100% Resin B | 44 | 0.902 | ND | 150 | 0.1 | 15 | 68 |
| Example 2I 100% Resin C | 51.6 | 0.938 | 157 | 123 | 0.2 | 49 | 56 |
| Example 2J 100% Resin D | 43 | ND | 22.7 | 150 | 0.3 | 650 | 48 |

Resin A = APPRYL PP3050NMI polypropylene resin supplied by Atochem
Resin B = AFFINITY 1880, a substantially linear ethylene/1-octene copolymer (1 I2 MI at 190° C. and 0.903 g/cc density) and supplied by The Dow Chemical Company.
Resin C = PRIMCOR 1410, an ethylene acrylic acid copolymer containing about 9.5% by wt. acrylic acid and having an I2 melt index of about 1.5 g/10 minutes and supplied by The Dow Chemical Company.
Resin D = PRIMACOR 5990, an ethylene acrylic acid copolymer containing about 20% by wt. acrylic acid and having an I2 melt index of about 1,300 g/10 minutes at 190° C. and supplied by The Dow Chemical Company.
Resin E = SURLYN 1702, an ethylene methacrylic acid ionomer neutralized with a zinc metal salt and supplied by Dupont Chemical Company.

We claim:

1. A multilayer resilient cushion foam floor or wall covering comprising a top layer, wherein the top layer includes:
   (a) a transparent upper wear layer comprised of at least one melt processed polyolefin polymer or at least one solvent dispersed polyolefin polymer or both,
   (b) a solvent dispersed or melt processed print layer comprised of at least one polyolefin polymer and interposed below the transparent upper wear layer, and
   (c) an optional melt processed polyolefin polymer or textile intermediate reinforcement layer interposed below the print layer, wherein the transparent upper wear layer and the print layer have a combined thickness of from about 50 to about 800 microns and the optional intermediate layer has a thickness of from about 5 to about 500 microns,
wherein the top layer is integrated with a foamed backing layer comprised of a latex composition, a melt processed polyolefin composition of at least one polyolefin polymer, or a solvent dispersed polyolefin composition of at least one polyolefin polymer, and
wherein at least one layer selected from the group cosisting of the transparent upper wear layer, the print layer, the optional intermediate reinforcement layer, when present, and the foam backing layer comprises a substantially linear ethylene polymer characterized as having
   (i) a melt flow ratio, $I_{10}/I_2 \geq 5.63$,
   (ii) a molecular weight distribution, $M_w/M_n$, as determined by gel permeation chromatography and defined by the equation:

$$(M_w/M_n) \leq (I_{10}/I_2) - 4.63,$$

(iii) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer,
   (iv) a single differential scanning calorimetry, DSC, melting peak between $-30$ and $150°$ C., and
   (v) a short chain branching distribution index greater than about 50 percent, or
a homogeneously branched linear ethylene polymer characterized as having a molecular weight distribution less than 3 and a short chain branching distribution index equal to or greater than 50 percent.

2. The multilayer covering of claim 1, wherein the top layer is integrated with a foamed latex composition.

3. The nmultilayer covering of claim 2, wherein the foamed latex composition comprises a carboxylated polymer.

4. The multilayer covering of claim 3, wherein the carboxylated polymer is a styrenic polymer.

5. The multilayer covering of claim 4, wherein the styrenic polymer is a styrene butadiene copolymer.

6. The nmultilayer covering of claim 1, wherein the top layer is integrated with a foamed latex composition or a foamed solvent dispersed composition and the selected foam composition includes a chemical blowing agent or microspheres containing a volatile compound or both.

7. The multilayer covering of claim 6, wherein the chemical blowing agent is azodicarbonamide and the volatile compound is isobutane.

8. The multilayer covering of claim 2, wherein the foamed latex composition is crosslinked with an epoxy resin.

9. The multilayer covering of claim 2, wherein the foamed latex composition is formulated with at least one organic or polymeric filler.

10. The multilayer covering of claim 9, wherein the at least one filler is high density polyethylene.

11. The multilayer covering of claim 1, wherein the at least one polyolefin polymer of the transparent upper wear layer is a substantially linear ethylene polymer characterized as having
   (a) a melit flow ratio, $I_{10}/I_2 \geq 5.63$,
   (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer,
   (d) a single differential scanning calorimetry, DSC, melting peak between $-30$ and $150°$ C., and
   (e) a short chain branching distribution index greater than about 50 percent, or a homogeneously branched linear ethylene polymer characterized as having a molecular weight distribution less than 3 and a short chain branching distribution index equal to or greater than 50 percent.

12. The multilayer covering of claim 11, wherein the homogeneously branched linear ethylene polymer is further characterized as having a single differential scanning calorimetry, DSC, melting peak between $-30$ and $150°$ C.

13. The multilayer covering of claim 1, wherein the homogeneously branched linear ethylene polymer is further characterized as having a single differential scanning calorimetry, DSC, melting peak between $-30$ and $150°$ C.

14. The multilayer covering of claim 1, wherein the transparent upper wear layer comprises at least one interpolymer of ethylene and at least one carbonyl-containing comonomer.

15. The multilayer covering of claim 14, wherein the at least one interpolymer of ethylene and at least one carbonyl-containing comonomer is an ethylene acrylic acid copolymer.

16. The multilayer covering of claim 1, wherein the transparent upper wear layer is prepared from an ammonium based dispersion.

17. The multilayer covering of claim 1, wherein the transparent upper wear layer is prepared using a mixed cation aqueous dispersion.

18. The multilayer covering of claim 17, wherein the mixed cation dispersion comprises ammonium and potassium cations.

19. The multilayer covering of claim 1, wherein the transparent upper wear layer is prepared using a potassium based aqueous dispersion.

20. The covering of claim 1, wherein the transparent upper wear layer comprises a mixture of a solvent dispersed interpolymer of ethylene and at least one α,β-unsaturated comonomer and a solvent dispersed substantially linear ethylene polymer characterized as having (a) a melt flow ratio, $I_{10}/I_2 \leq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 150° C., and (e) a short chain branching distribution index greater than about 50 percent, or a homogeneously branched linear ethylene polymer characterized as having a molecular weight distribution less than 3 and a short chain branching distribution index equal to or greater than 50 percent.

21. The multilayer covering of claim 20, wherein the homogeneously branched linear ethylene polymer is further characterized as having a single differential scanning calorimetry, DSC, melting peak between −30 and 150° C.

22. The rultilayer covering of claim 1, wherein the print layer is foamed.

* * * * *